(12) United States Patent
Suzuki et al.

(10) Patent No.: US 12,060,029 B2
(45) Date of Patent: Aug. 13, 2024

(54) AIRBAG DEVICE

(71) Applicant: TOYODA GOSEI CO., LTD., Kiyosu (JP)

(72) Inventors: Yuya Suzuki, Kiyosu (JP); Koji Kawamura, Kiyosu (JP); Takenori Ozaki, Nagoya (JP)

(73) Assignee: TOYODA GOSEI CO., LTD., Aichi (JP)

( * ) Notice: Subject to any disclaimer, the term of this patent is extended or adjusted under 35 U.S.C. 154(b) by 18 days.

(21) Appl. No.: 18/059,666

(22) Filed: Nov. 29, 2022

(65) Prior Publication Data

US 2023/0174012 A1    Jun. 8, 2023

(30) Foreign Application Priority Data

Dec. 7, 2021    (JP) .................................. 2021-198899

(51) Int. Cl.
*B60R 21/239*    (2006.01)
*B60R 21/203*    (2006.01)
*B60R 21/2338*    (2011.01)

(52) U.S. Cl.
CPC .......... *B60R 21/239* (2013.01); *B60R 21/203* (2013.01); *B60R 21/2338* (2013.01); *B60R 2021/2395* (2013.01)

(58) Field of Classification Search
CPC . B60R 21/239; B60R 21/203; B60R 21/2338; B60R 2021/2395; B60R 2021/23382; B60R 2021/23384
See application file for complete search history.

(56) References Cited

U.S. PATENT DOCUMENTS

| | | | | |
|---|---|---|---|---|
| 6,648,371 B2 * | 11/2003 | Vendely | ............... | B60R 21/217 280/739 |
| 6,773,030 B2 * | 8/2004 | Fischer | ................. | B60R 21/233 280/739 |
| 7,600,782 B2 * | 10/2009 | Ishiguro | ............... | B60R 21/239 280/739 |
| 7,762,584 B2 * | 7/2010 | Morita | ................. | B60R 21/239 280/739 |

(Continued)

FOREIGN PATENT DOCUMENTS

| | | |
|---|---|---|
| EP | 2017141 A2 | 1/2009 |
| JP | 2009-23395 A | 2/2009 |
| JP | 2009-90965 A | 4/2009 |

*Primary Examiner* — Amy R Weisberg
*Assistant Examiner* — Tiffany L Webb
(74) *Attorney, Agent, or Firm* — Posz Law Group, PLC

(57) ABSTRACT

An airbag device includes an airbag having an exhaust hole and a flap member that can close off the exhaust hole. The flap member includes a flap main body and a coupling member. The leading end of the coupling member is coupled with an opening/closing control device. The flap main body closes off the exhaust hole from an inner peripheral face side of the airbag. A width on the base portion side is set to be greater than a width of the exhaust hole. Whole of the base portion side is joined to the peripheral edge of the exhaust hole in the airbag. The flap main body covers the exhaust hole in a region between straight lines that connect one end each of a joint region on the base portion and a region on the leading end to which the coupling member is caused to be coupled.

7 Claims, 12 Drawing Sheets

(56) References Cited

U.S. PATENT DOCUMENTS

| | | | | |
|---|---|---|---|---|
| 7,878,538 B2* | 2/2011 | Abe | ...................... | B60R 21/239 280/739 |
| 8,015,906 B2* | 9/2011 | Ito | ......................... | B60R 21/239 280/739 |
| 8,353,532 B2* | 1/2013 | Abe | ................... | B60R 21/2338 280/739 |
| 8,491,004 B2* | 7/2013 | Mendez | ............... | B60R 21/239 280/739 |
| 8,590,927 B2* | 11/2013 | Mendez | ............. | B60R 21/2338 280/739 |
| 9,714,000 B1* | 7/2017 | Osterfeld | .............. | B60R 21/239 |
| 9,758,124 B2* | 9/2017 | Kruse | .................. | B60R 21/013 |
| 11,130,468 B2* | 9/2021 | Baba | .................. | B60R 21/2338 |
| 11,608,024 B2* | 3/2023 | Tanaka | ................. | B60R 21/264 |
| 11,708,047 B2* | 7/2023 | Suzuki | ................. | B60R 21/239 280/742 |
| 2017/0158161 A1* | 6/2017 | Gammill | ............ | B60R 21/2338 |
| 2017/0305381 A1* | 10/2017 | Kwon | ................ | B60R 21/2338 |

\* cited by examiner

AIRBAG DEVICE

CROSS REFERENCE TO RELATED APPLICATIONS

The present application claims priority from Japanese Patent Application No. 2021-198899 of Suzuki et al., filed on Dec. 7, 2021, the entire disclosures of which is incorporated herein by reference.

BACKGROUND

1. Technical Field

The present disclosure relates to an airbag device including an airbag that is folded and housed in a housing region and inflates in such a way as to protrude from the housing region owing to an inflating gas being caused to flow into an interior.

2. Description of Related Art

As an existing airbag device, there is a configuration wherein an exhaust hole through which some of an inflating gas can be discharged is provided in an airbag, and an internal pressure of the airbag when inflating is controlled by an opening and closing of the exhaust hole being controlled by an opening/closing control device in accordance with a sitting position and a physique of an occupant seated in a seat, as shown in JP2009-90965A. This airbag device is such that the exhaust hole provided in the airbag can be closed off using a flap member. Specifically, the flap member is configured to include a flap main body, which is configured of a sheet having flexibility, and a coupling member extending from the flap main body. The flap main body is set to be of an approximately rectangular form of a size such that the exhaust hole can be closed off, and has a base portion side joined to a peripheral edge of the exhaust hole. The coupling member is such that a coupling end is coupled to the opening/closing control device, which is disposed on a housing region side. Also, in the airbag device described in JP2009-90965A, the flap main body is disposed in such a way as to be able to close off the exhaust hole from an outer peripheral face side of the airbag. The coupling member is of a configuration extending from the flap main body, in such a way as to cause the base portion side to be coupled, in a region that is an approximate center of the flap main body and covers the exhaust hole. Further, the flap main body is such that, when the airbag inflates in a state wherein a coupling of the coupling member to the opening/closing control device is maintained, the closed off state of the exhaust hole is maintained, and a discharge of inflating gas from the exhaust hole is restricted.

This existing airbag device is such that when the airbag is caused to inflate in a state wherein a coupling of the coupling member to the opening/closing control device is maintained, tension acts on the flap main body between a region to which the coupling member is coupled and the two ends of the base portion side joined to the exhaust hole peripheral edge. Further, the state wherein the exhaust hole is closed off by the flap main body is maintained by this kind of tension. In the existing airbag device, however, the flap main body is configured to be disposed on the outer peripheral face side of the airbag. Also, in the existing airbag device, the base portion side of the coupling member is coupled to a position in the approximate center of the flap main body (a position that coincides with an aperture of the exhaust hole). This means that even when adopting a configuration that utilizes tension in this way, there is concern that the flap main body will rise up due to inflating gas that has flowed into an interior of the airbag, and the inflating gas will leak from the exhaust hole.

SUMMARY

An airbag device of the present disclosure includes:
an airbag, folded and housed in a housing region, configured to inflate in such a way as to protrude from the housing region owing to an inflating gas being caused to flow into an interior, and having an exhaust hole from which some of the inflating gas caused to flow into the interior can be discharged when opened;
an opening/closing control device that is disposed on the housing region side and can control an opening and closing of the exhaust hole; and
a flap member that can close off the exhaust hole, the flap member including
a flap main body that is configured of a sheet having flexibility, and is set to be of a size such that the exhaust hole can be closed off, wherein a base portion side is joined to a peripheral edge of the exhaust hole in a position farther to an outer peripheral edge side of the airbag than the exhaust hole,
and a coupling member that extends from a leading end side opposing the base portion of the flap main body, and is of a configuration such that a coupling end side of the extended leading end is caused to be coupled with the opening/closing control device on the housing region side,
the flap main body is configured in such a way that when the airbag inflates in a state wherein a coupling of the coupling member to the opening/closing control device is maintained, a closed off state of the exhaust hole is maintained, and when the airbag inflates in a state wherein a coupling of the coupling member to the opening/closing control device is released, the exhaust hole is caused to open; and wherein
the flap main body has an approximately symmetrical external form with a central line in a width direction following a longitudinal direction of the coupling member as a reference, and is configured in such a way that the coupling member is caused to extend from an approximate width direction center on the leading end side,
the flap main body is disposed in such a way as to be able to close off the exhaust hole from an inner peripheral face side of the airbag, a width dimension on the base portion side is set to be greater than an aperture width dimension of the exhaust hole on a side in a direction approximately perpendicular to the longitudinal direction of the coupling member, an approximate whole of the base portion side is joined to the peripheral edge of the exhaust hole in the airbag,
and the flap main body is configured in such a way as to cover the exhaust hole in a region between straight lines that connect one end each of a joint region on the base portion side and a region on the leading end side to which the coupling member is caused to be coupled.

BRIEF DESCRIPTION OF DRAWINGS

FIGS. 12A and 12B are schematic perspective views showing an inflated state of the airbag in the airbag device of the embodiment, wherein FIG. 12A shows a state wherein a coupled state of the flap member and the engagement member is maintained, and FIG. 12B shows a state wherein a coupled state of the flap member and the engagement member is released.

DETAILED DESCRIPTION

Exemplary embodiments of the present disclosure are described below with reference to the accompanying drawings. However, the invention is not limited to the embodiments disclosed herein. All modifications within the appended claims and equivalents relative thereto are intended to be encompassed in the scope of the claims.

Figure 2:
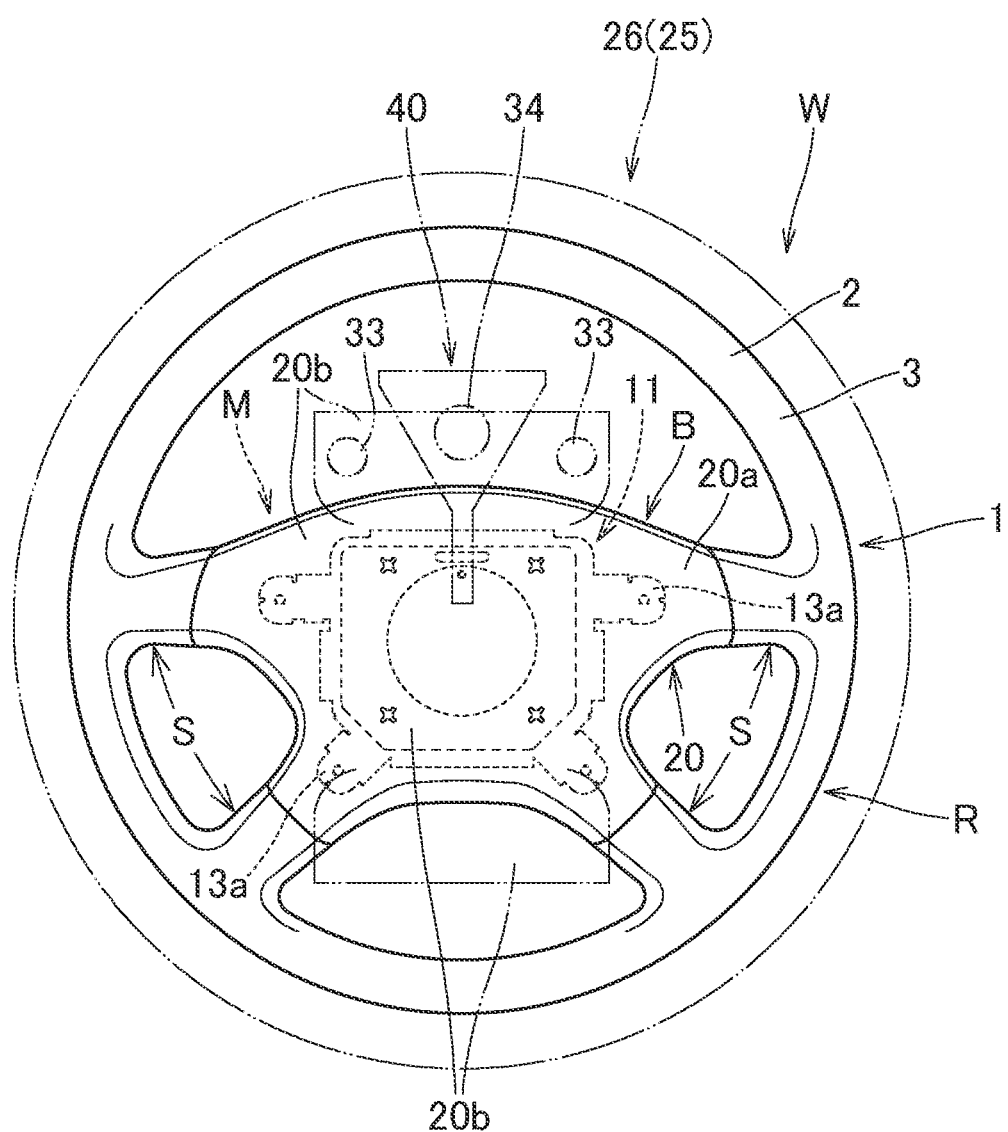
FIG. 2 is a schematic plan view of a steering wheel on which the airbag device of the embodiment is mounted.
Figure 3:
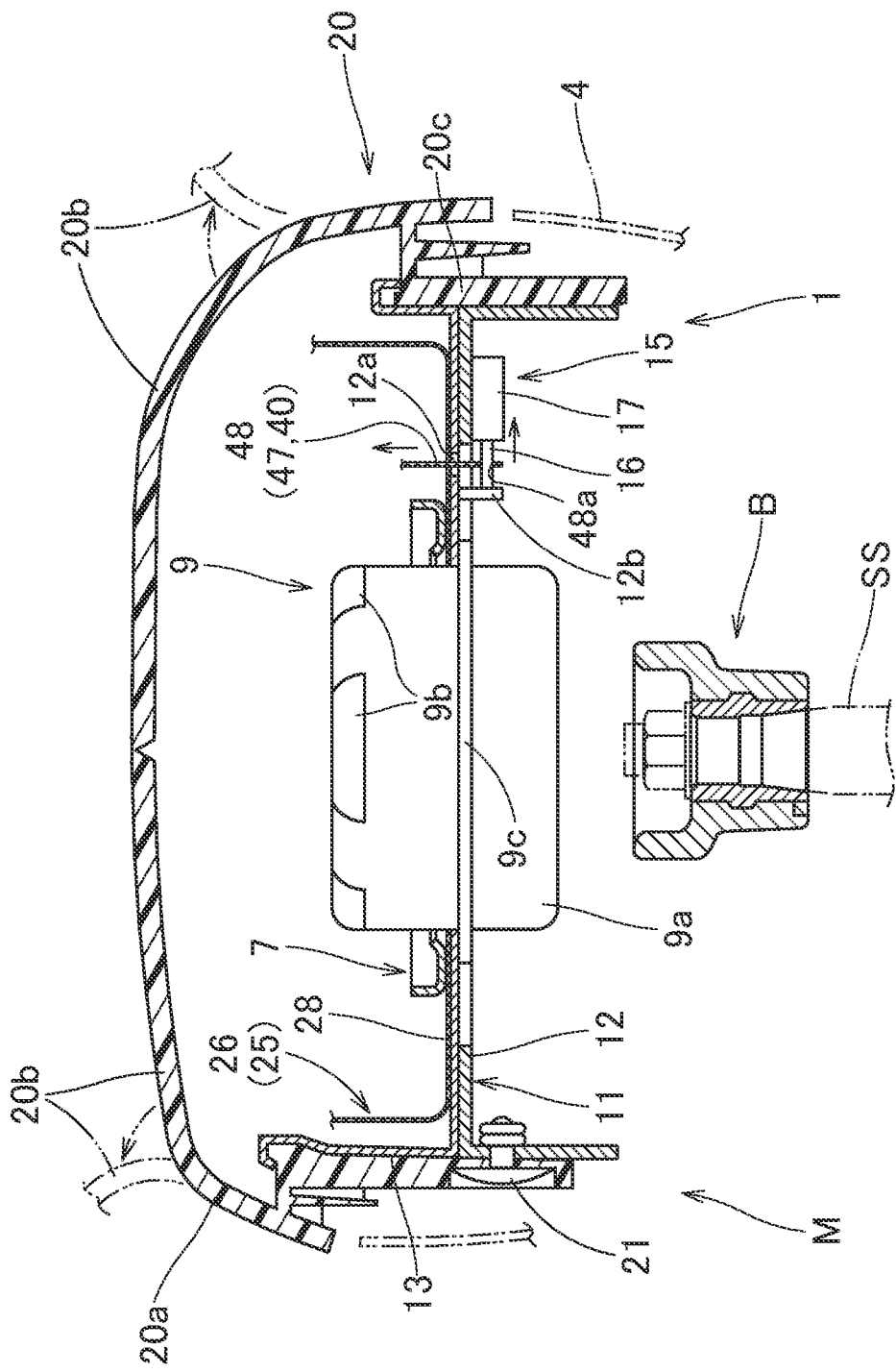
FIG. 3 is a schematic enlarged sectional view in a front-rear direction of the airbag device of the embodiment.
Figure 8:
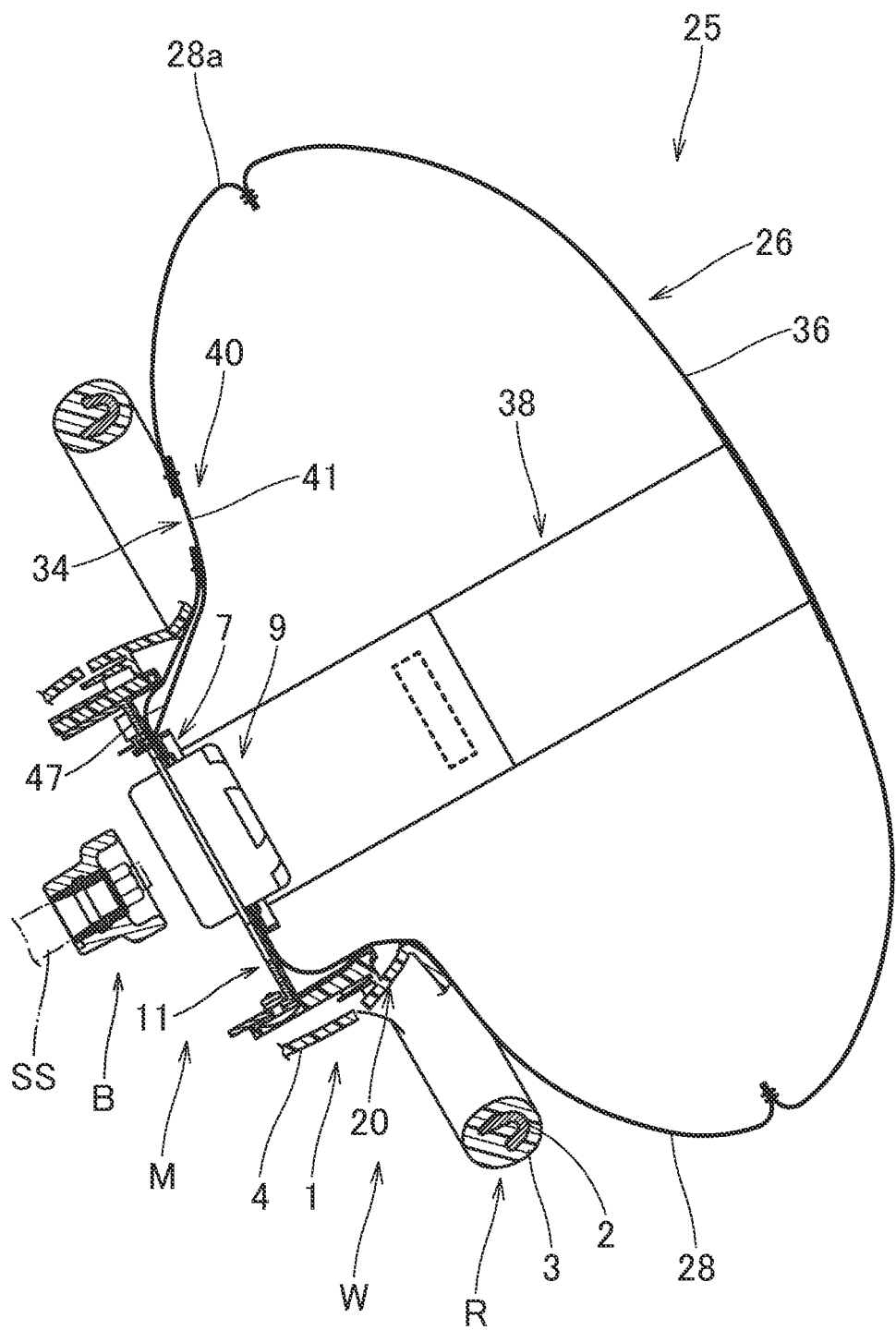
FIG. 8 is a schematic sectional view showing a state wherein inflation of the airbag is caused to be completed in a state wherein a coupled state of the flap member and an engagement member is maintained in the airbag device of the embodiment.

Hereafter, an embodiment of the invention will be described based on the drawings. In the embodiment, a description will be given employing an airbag device mounted on a steering wheel W as an example of an airbag device M. As shown in FIGS. 2, 3, and 8, the steering wheel W includes a steering wheel main body 1 and the airbag device M, which is disposed on an upper portion of a boss portion B in a center of the steering wheel main body 1. In the case of the embodiment, the steering wheel main body 1 includes a ring portion R, which is gripped when steering; the boss portion B, which is disposed in an approximate center of the ring portion R and coupled to a steering shaft SS; and a multiple (four in the case of the embodiment) of spoke portions S that couple the boss portion B and the ring portion R. In terms of constituent parts, the steering wheel W is configured of the airbag device M and the steering wheel main body 1.

In the embodiment, unless specifically stated otherwise, front-rear, up-down, and left-right directions have a time when the steering wheel W mounted in a vehicle is steered straight ahead as a reference, and the front-rear, up-down, and left-right directions are shown with an up-down along an axial direction of the steering shaft SS to which the steering wheel W is attached (refer to FIGS. 3 and 8) as the up-down direction, a front-rear of the vehicle that is a direction perpendicular to the axial direction of the steering shaft SS as the front-rear direction, and a left-right of the vehicle that is a direction perpendicular to the axial direction of the steering shaft SS as the left-right direction.

The steering wheel main body 1 includes a core metal 2, formed of a metal such as an aluminum alloy, disposed in such a way as to couple the ring portion R, the boss portion B, and the like; a cover layer 3 made of a synthetic resin that covers regions of the core metal 2 in the ring portion R and the spoke portion S; and a lower cover 4 made of a synthetic resin, which covers a portion below the boss portion B (refer to FIGS. 2, 3, and 8).

As shown in FIGS. 2 and 3, the airbag device M includes an airbag 25, a flap member 40 that can close off an exhaust hole 34, to be described hereafter, formed in the airbag 25, an inflator 9 that supplies inflating gas to the airbag 25, a case 11 acting as a housing region that houses and holds the folded airbag 25 and the inflator 9; an airbag cover 20 that covers the folded airbag 25; a retainer 7 for attaching the airbag 25 and the inflator 9 to the case 11; and a holding and releasing device 15 acting as an opening/closing control device that controls an opening and closing of the exhaust hole 34 of the airbag 25. In the airbag device M of the embodiment, the inflator 9 and the holding and releasing device 15 are configured in such a way that an operation is controlled by a control device 70 shown in FIG. 1.

Figure 1:
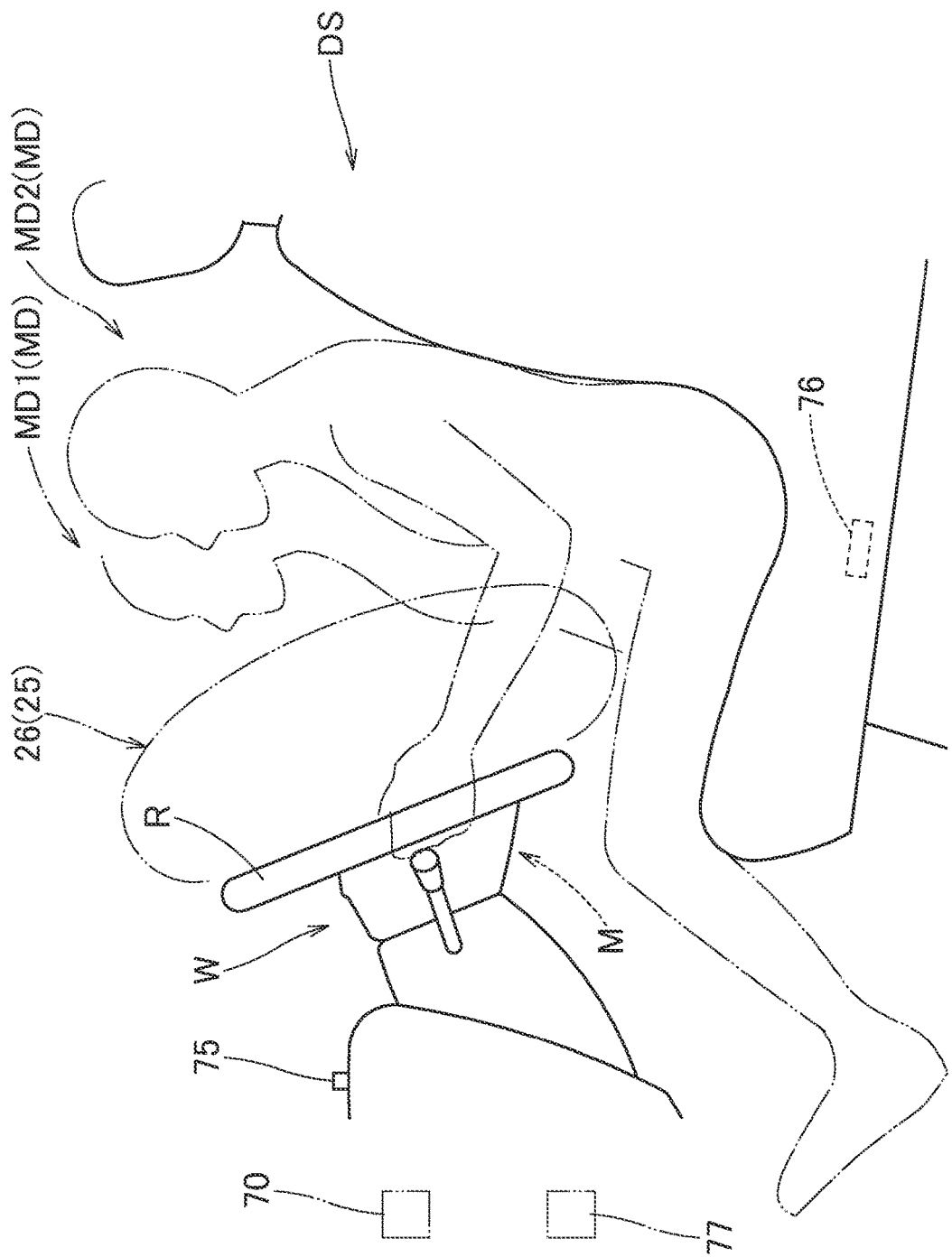
FIG. 1 is a schematic view showing a vicinity in which a steering wheel airbag device, which is one embodiment of the present disclosure, is mounted.

As shown in FIG. 1, the control device 70 is electrically connected to an occupant detecting sensor that can detect a physique, a sitting position, and the like, of a driver MD as an occupant seated in a seat (driver's seat) DS. The occupant detecting sensor is, for example, a position detecting sensor 75, which can detect a distance between the steering wheel W and the driver MD, or a weight detecting sensor 76, which can detect a weight of the driver MD. Also, the control device 70 is also electrically connected to a collision detecting sensor 77 that can detect an acceleration, an acceleration direction, and the like, of the vehicle. Further, the control device 70 causes an electrical signal from the position detecting sensor 75, the weight detecting sensor 76, or the collision detecting sensor 77 to be input, thereby causing the inflator 9 to operate, and causing the holding and releasing device 15 to operate. Further, in the case of the embodiment, an operation of the holding and releasing device 15 is controlled by the control device 70 in such a way that a rise in an internal pressure of the airbag 25 can be controlled when the airbag 25 inflates when the inflator 9 operates. Specifically, an operation of the holding and releasing device 15 is controlled by the control device 70 in such a way as to cause an inflating gas G that has flowed into the airbag 25 to be discharged to outside the airbag 25, thereby causing the airbag 25 to inflate in a preferred inflation mode.

The inflator 9 includes an approximately cylindrical main body portion 9a, which has a multiple of gas exhaustports 9b, and a flange portion 9c for attaching the inflator 9 to the case 11. Unshown through holes through which unshown bolts of the retainer 7 are caused to pass are formed in the flange portion 9c. The inflator 9 is electrically connected to the control device 70.

The case 11 acting as the housing region is made of sheet metal and, as shown in FIG. 3, includes a bottom wall portion 12 of an approximately rectangular plate form, to which the inflator 9 is attached by being inserted from below, and a peripheral wall portion 13 that extends upward and downward from an outer peripheral edge of the bottom wall portion 12. A through hole 12a, through which a coupling end 48 side of a coupling belt 47 acting as a coupling unit, to be described hereafter, of the flap member 40 can be inserted, is formed in a region of the bottom wall portion 12 on a front side of an aperture (reference sign omitted) for inserting the main body portion 9a of the inflator 9 through. Four attachment pieces 13a extending outward are formed on an upper end of the peripheral wall portion 13 (refer to FIG. 2). The airbag device M of the embodiment is of a configuration mounted on the upper portion of the boss portion B of the steering wheel main body 1 already installed on the steering shaft SS by the case 11 being attached and fixed to the core metal 2 of the steering wheel W utilizing attachment substrates of unshown horn switch mechanisms attached to the attachment pieces 13a. Also, a side wall portion 20c of the airbag cover 20 is attached to the peripheral wall portion 13 of the case 11 utilizing a rivet 21 or the like (refer to FIG. 3). In the case of the embodiment, the airbag 25 and the inflator 9 are attached to the bottom wall portion 12 of the case 11 with unshown bolts of the retainer 7 disposed inside the airbag 25 as an attachment device. The bolts pass through a peripheral edge of an inflow aperture 29 in the airbag 25, the bottom wall portion 12 of the case 11, and the flange portion 9c of the inflator 9, and are fastened with nuts.

Also, the holding and releasing device 15 acting as the opening/closing control device is disposed in a region that is on a lower portion side of the bottom wall portion 12, in a vicinity of the through hole 12a. The holding and releasing device 15 is of a configuration that couples the coupling end 48 side of the coupling belt 47 of the flap member 40. The holding and releasing device 15 is configured of an engagement pin 16, which is inserted through a coupling hole 48a formed in the coupling end 48 of the coupling belt 47, and an actuator 17, which is fixed to a lower face side of the bottom wall portion 12 and operates in such a way as to be able to draw in the engagement pin 16. When the actuator 17 operates in such a way as to cause the engagement pin 16 to be drawn in, the engagement pin 16 shifts from a state of engaging the coupling end 48 of the coupling belt 47 to a state of releasing the engagement, and the coupled and held state of the coupling end 48 is ended. The actuator 17 is electrically connected to the control device 70, and provided that the engagement pin 16 can be moved by an electrical signal from the control device 70, a piston cylinder that utilizes a fluid pressure including oil pressure, water pressure, air pressure, or a case wherein an inflating gas pressure of an inflator or the like is generated, a motor that utilizes those fluid pressures or electricity, an electromagnetic solenoid, a spring that utilizes a biasing force when returning, or the like, can be used. As shown in FIG. 3, a support stand 12b is disposed on a peripheral edge of the through hole 12a on the lower face of the bottom wall portion 12, on an edge portion side opposing the actuator 17 (in the case of the embodiment, a rear edge side of the through hole 12a). The support stand 12b supports a leading end of the engagement pin 16 of the holding and releasing device 15, and is for preventing the coupling belt 47 from becoming detached from the engagement pin 16 when engaging (for maintaining a coupled and held state of the coupling belt 47). In the embodiment, the holding and releasing device 15, and the flap member 40 wherein the coupling end 48 side of the coupling belt 47 is coupled to the holding and releasing device 15, configure an internal pressure adjusting mechanism that can adjust the internal pressure of the airbag 25 when inflation is completed.

The airbag cover 20 is made of a synthetic resin, and includes a ceiling wall portion 20a, which covers a portion above the airbag 25 housed in the case 11, and the side wall portion 20c, of an approximately square tube form, which extends downward from a vicinity of an outer peripheral edge of the ceiling wall portion 20a. Two door portions 20b and 20b, which open at the front and rear owing to being pushed by the inflating airbag 25, are formed in the ceiling wall portion 20a.

Figure 4:
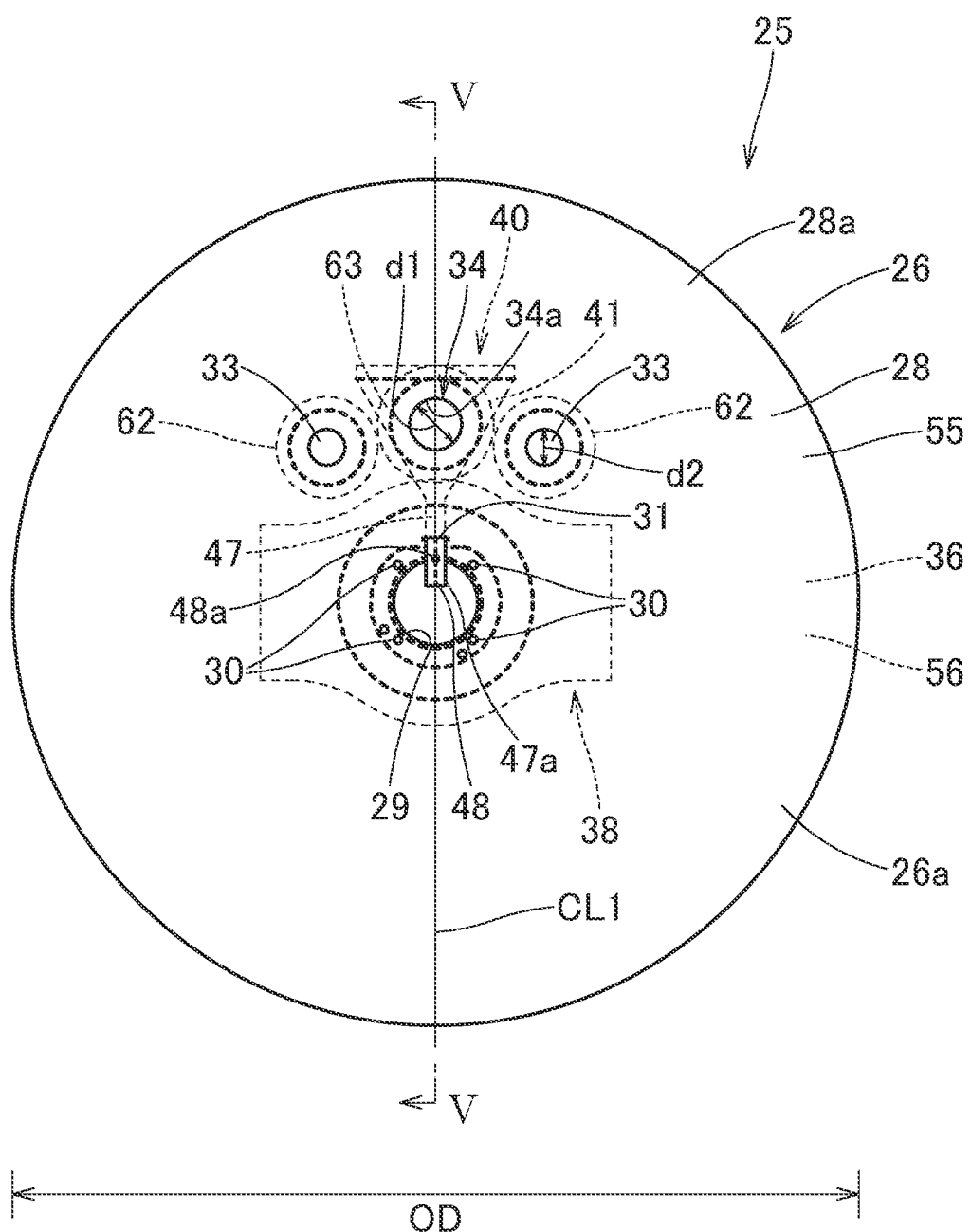
FIG. 4 is a bottom view of a state wherein an airbag used in the airbag device of the embodiment is flattened.
Figure 5:
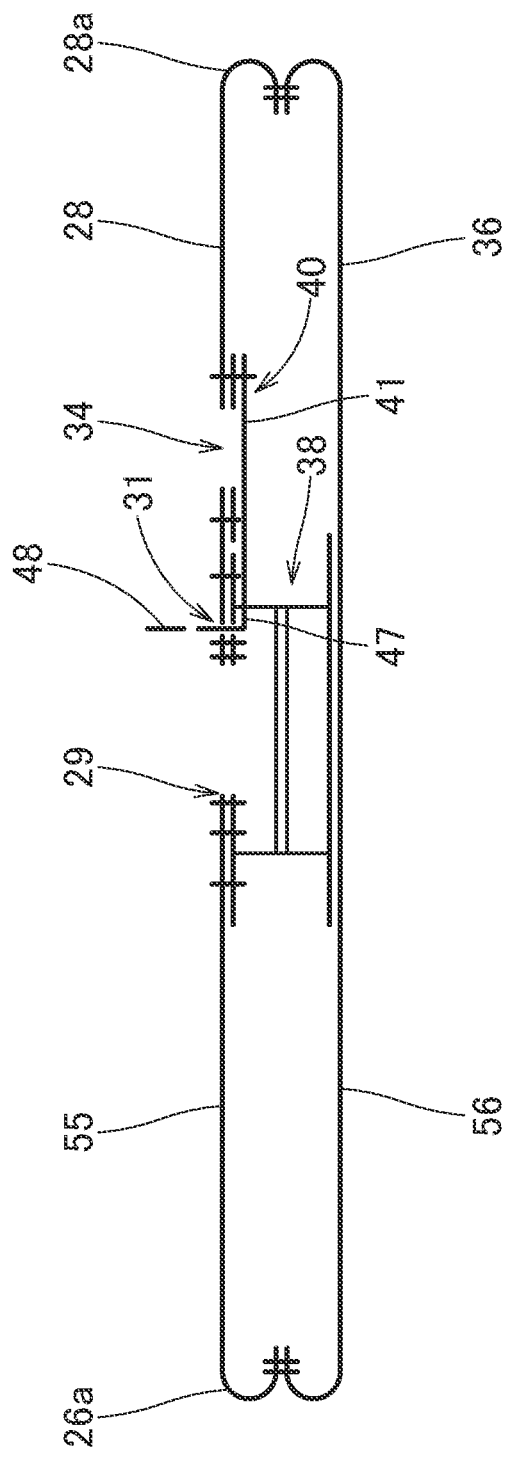
FIG. 5 is a vertical sectional view of the airbag of FIG. 4, and shows a V-V region of FIG. 4.

In the case of the embodiment, the airbag 25 includes a bag-form bag main body 26, and a tether 38 that regulates a form of the bag main body 26 when inflation is completed, as shown in FIGS. 4 and 5.

Figure 6:
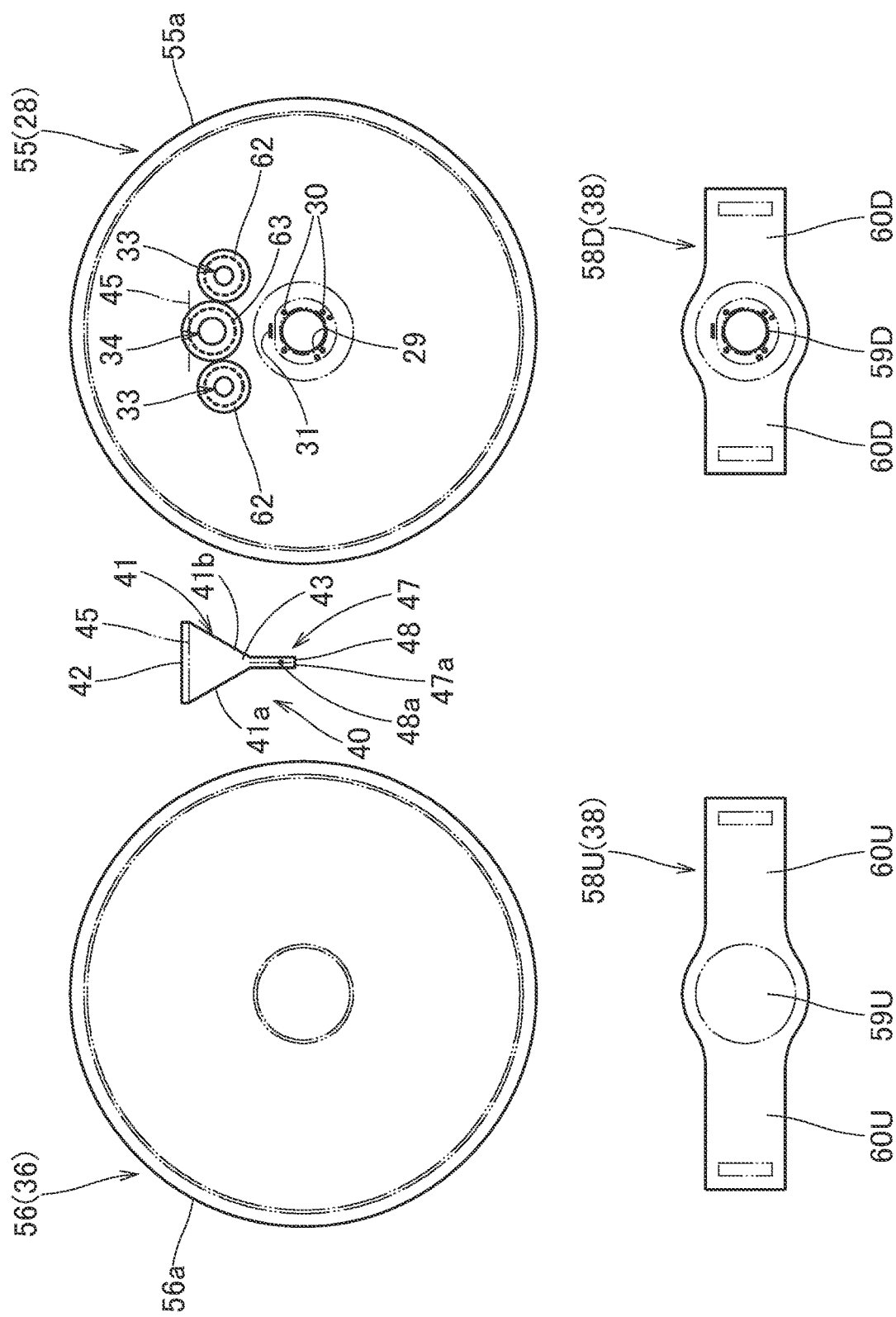
FIG. 6 is a plan view showing base fabrics configuring the airbag of FIG. 4.

The bag main body 26 is of a configuration such as to be able to cover approximately a whole of an upper face side of the steering wheel W when inflation is completed. Specifically, a form of the bag main body 26 when inflation is completed seen from above is an approximately circular form that can cover a whole of the ring portion R, as shown by a two-dot chain line in FIG. 2. Also, a form of the bag main body 26 when inflation is completed seen from a side is an approximately elliptical sphere form, as shown by a two-dot chain line in FIG. 1 and in FIG. 8. As shown in FIGS. 4 and 5, the bag main body 26 includes a driver side wall portion 36, which is disposed on the driver MD side when inflation is completed, and a vehicle body side wall portion 28 disposed on the steering wheel W (vehicle body) side. As shown in FIG. 6, the bag main body 26 is formed in a bag form by outer peripheral edges 55a and 56a of an approximately circular driver side panel 56 and vehicle body side panel 55, whose external forms are approximately the same, being joined together. The driver side panel 56 and the vehicle body side panel 55 configuring the bag main body 26 are formed of a fabric having flexibility, such as a polyamide yarn or a polyester yarn.

As shown in FIG. 4, the inflow aperture 29, through which inflating gas can flow into the interior, is formed, opened in a circular form, in an approximate center of the vehicle body side wall portion 28 in the bag main body 26. The inflow aperture 29 is an aperture into which the main body portion 9a of the inflator 9 is inserted from below. Four attachment holes 30 are formed in a peripheral edge of the inflow aperture 29. The attachment holes 30 are for inserting unshown bolts formed on the retainer 7 through. Also, an insertion hole 31 is formed in a slit form approximately following the left-right direction in the peripheral edge of the inflow aperture 29. In the case of the embodiment, the insertion hole 31 is formed on a front edge side of the inflow aperture 29. The insertion hole 31 is a hole for inserting the coupling end 48 of the coupling belt 47 of the flap member 40 through.

Also, a vent hole 33 through which excess inflating gas that has flowed into the interior is discharged is formed in the vehicle body side wall portion 28 of the bag main body 26. In the case of the embodiment, the vent hole 33 is opened in an approximately circular form, and is formed in two positions having bilateral symmetry, with a line following the front-rear direction that passes through a center of the inflow aperture 29 as a reference line CL1 (refer to FIG. 4).

More specifically, the vent hole 33 is formed in a position on the inflow aperture 29 side between the inflow aperture 29 and an outer peripheral edge 28a (specifically, a position in the region of one-third from the inflow aperture 29) in the vehicle body side wall portion 28 of the bag main body 26 in a flattened state. The vent hole 33 is disposed in a region farther to an inner side than the ring portion R when inflation of the airbag 25 (the bag main body 26) is completed (refer to a two-dot chain line of FIG. 2 and to FIGS. 9 and 12).

Figure 9:
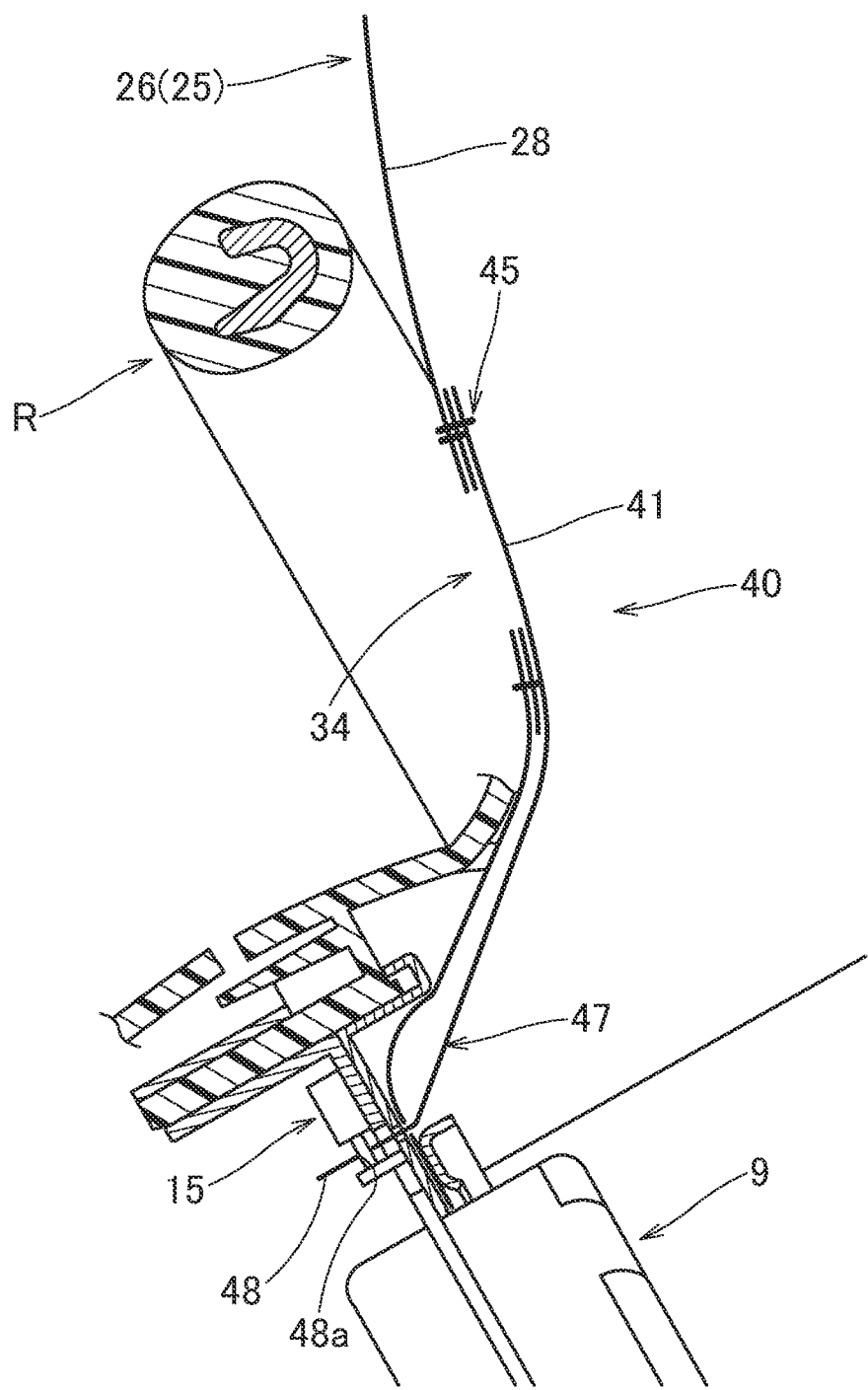
FIG. 9 is a partially enlarged sectional view showing a vicinity of a region of an exhaust hole and the flap member when inflation of the airbag is completed in a state wherein a coupled state of the flap member and the engagement member is maintained in the airbag device of the embodiment.
Figure 10:
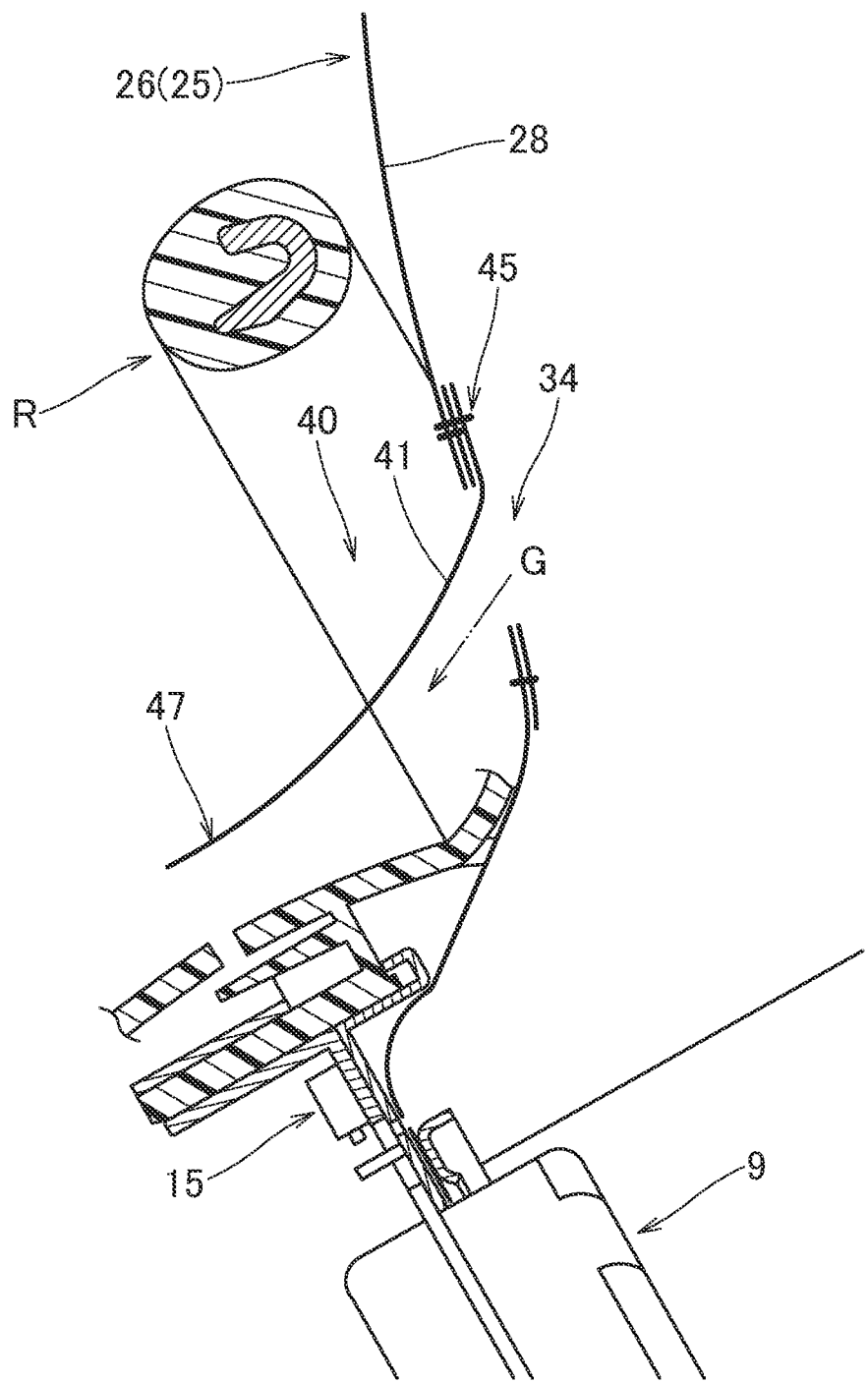
FIG. 10 is a partially enlarged sectional view showing a vicinity of a region of the exhaust hole and the flap member when inflation of the airbag is completed in a state wherein a coupled state of the flap member and the engagement member is released in the airbag device of the embodiment.

Furthermore, the exhaust hole 34, which is opened and closed by the flap member 40, is formed separately from the always opened vent holes 33 and 33 in the bag main body 26. An aperture form of the exhaust hole 34 is approximately circular. In the case of the embodiment, the exhaust hole 34 is disposed in a position between the vent holes 33 and 33, in front of the inflow aperture 29, in a state wherein the bag main body 26 is flattened. Specifically, the exhaust hole 34, and the vent holes 33 and 33 disposed one on each of left and right sides of the exhaust hole 34, are disposed in such a way as to be of an approximate radial form, with the inflow aperture 29 as a center. Also, in the same way as the vent holes 33 and 33, the exhaust hole 34 is also formed in a position on the inflow aperture 29 side between the inflow aperture 29 and the outer peripheral edge 28a (specifically, a position in the region of one-third from the inflow aperture 29) in the vehicle body side wall portion 28 of the bag main body 26 in a flattened state. A region of the vehicle body side wall portion 28 of the bag main body 26 in which the exhaust hole 34 is disposed is a region disposed in a position farther to the inner side than the ring portion R when inflation of the bag main body 26 is completed (refer to a two-dot chain line of FIG. 2 and to FIGS. 9 to 12). Specifically, a region of the vehicle body side wall portion 28 in which the exhaust hole 34 is disposed is a region whose curvature is set to be low, and which is approximately planar, in a cross-section when inflation is completed, as shown in FIGS. 9 and 10. Also, in the case of the embodiment, an opening area of the exhaust hole 34 is set to be larger than that of the vent holes 33. Specifically, an inner diameter dimension d1 of the exhaust hole 34 is set to be in the region of 40 mm, while an inner diameter dimension d2 of each vent hole 33 is set to be in the region of 28 mm (refer to FIG. 4). That is, the inner diameter dimension d1 of the exhaust hole 34 is set to be in the region of 1.4 times the inner diameter dimension d2 of each vent hole 33. Incidentally, in the case of the embodiment, an outer diameter dimension OD of the flattened bag main body 26 (refer to FIG. 4) is set to be in the region of 650 mm. Also, the airbag 25 of the embodiment is such that peripheral edges of the exhaust hole 34 and the vent holes 33 are reinforced using approximately annular reinforcing fabrics 62 and 63.

The tether 38 that regulates the form of the bag main body 26 when inflation is completed is disposed in such a way as to couple the peripheral edge of the inflow aperture 29 in the vehicle body side wall portion 28 and a vicinity of a center of the driver side wall portion 36. The tether 38 regulates a distance between the vicinity of the center of the driver side wall portion 36 and the peripheral edge of the inflow aperture 29 when inflation is completed. In the case of the embodiment, the tether 38 is formed in two places, one each on left and right sides of the inflow aperture 29. The tether 38 is configured of two tether base materials 58U and 58D, as shown in FIG. 6. The tether base materials 58U and 58D include, respectively, attachment side regions 59U and 59D joined to the vehicle body side wall portion 28 side or the driver side wall portion 36 side, and two tether configuring portions 60U and 60D extending from outer peripheral edges of the attachment side regions 59U and 59D. The tether base materials 58U and 58D form the tether 38 by end portions of the corresponding tether configuring portions 60U and 60D being joined together in a state wherein the attachment side regions 59U and 59D are joined to the vehicle body side wall portion 28 side or the driver side wall portion 36 side. In the same way as the bag main body 26, the tether base materials 58U and 58D configuring the tether 38 are formed of a fabric having flexibility, such as a polyamide yarn or a polyester yarn.

Figure 7:
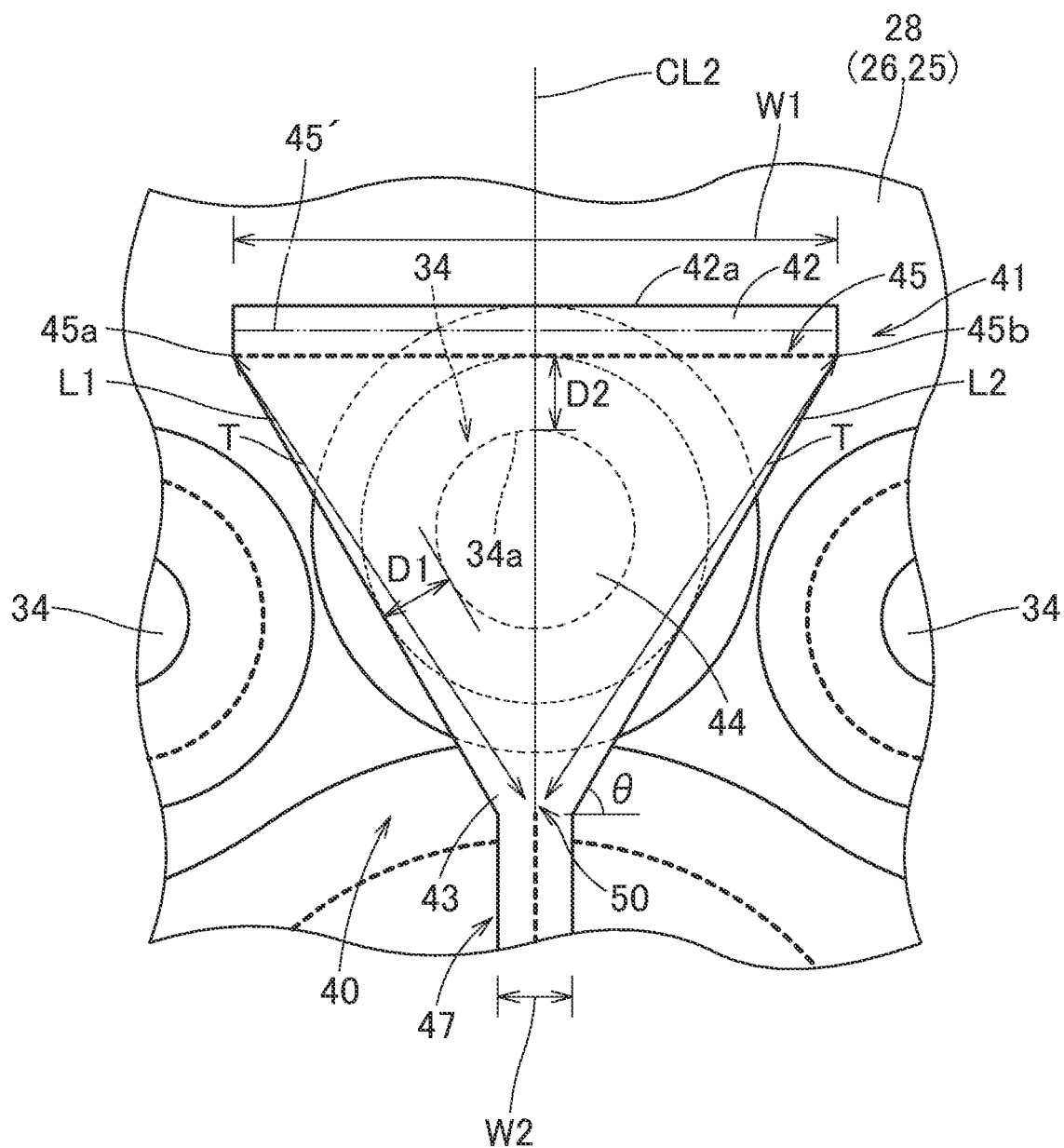
FIG. 7 is a schematic plan view seen from an inner peripheral face side of the airbag showing the airbag of FIG. 4 and a flap member.

The flap member 40 that can close off the exhaust hole 34 of the airbag 25 is disposed on an inner peripheral face side of the airbag 25 (the bag main body 26). The flap member 40 includes a flap main body 41, which closes off the exhaust hole 34, and the coupling belt 47, which acts as a coupling member extending from the flap main body 41. The flap main body 41 and the coupling belt 47 are configured in an integrated manner of a sheet having flexibility, as shown in FIGS. 6 and 7. Specifically, the flap main body 41 and the coupling belt 47 are formed of a fabric having flexibility, such as a polyamide yarn or a polyester yarn, in the same way as the bag main body 26 and the tether 38.

The flap main body 41 is set to be of a size from the inner peripheral face side of the bag main body 26 such that the exhaust hole 34 can be closed off. In the case of the embodiment, an external form of the flap main body 41 is an approximate isosceles triangle having a base portion 42 side joined to a peripheral edge of the exhaust hole 34 as a widest portion, and becoming narrower toward a leading end 43 side. The flap main body 41 is such that the base portion 42 side is joined to the peripheral edge of the exhaust hole 34 in a position nearer to an outer peripheral edge 26a side of the airbag 25 (the bag main body 26) than the exhaust hole 34. Specifically, the flap main body 41 is disposed, in a state wherein the bag main body 26 is flattened, in a position such that while a center in a width direction (the left-right direction) is caused to approximately coincide with a center of the exhaust hole 34, a leading edge 42a on the base portion 42 side is caused to approximately follow the left-right direction. The base portion 42 side of the flap main body 41 is sewn to a region on a front edge side of the exhaust hole 34 in the vehicle body side wall portion 28 over a whole left-right region, using thread (refer to FIGS. 4 and 7). That is, the flap main body 41 is configured in such a way that an external form is approximately symmetrical, with a central line CL2 in a width direction (the left-right direction), which is a direction following the front-rear direction (a longitudinal direction of the coupling belt 47, to be described hereafter), as a reference (refer to FIG. 7), and the leading end 43 is positioned on the central line CL2. In the flap main body 41, edge portions 41a and 41b disposed opposing on the width direction (left-right direction) side have bilateral symmetry, and are formed to be inclined with respect to the front-rear direction.

Specifically, the flap main body 41 is such that, in order to be able to close off the whole plane of the exhaust hole 34, a width dimension on the base portion 42 side is set to be greater than the inner diameter dimension of the exhaust hole 34 (an opening width dimension on the left-right direction side (a side in a direction approximately perpendicular to the longitudinal direction of the coupling belt 47) of the exhaust hole 34). The flap main body 41 in a state covering the exhaust hole 34 is such that edge portions (the edge portions 41a and 41b) on the two edges opposing on the width direction sides (the left-right direction sides) are positioned to the left and the right of the exhaust hole 34. The leading end 43 of the flap main body 41 in a state covering the exhaust hole 34 is positioned to the rear of the exhaust hole 34. Specifically, a width dimension W1 of the base portion 42 side of the flap main body 41 (a length dimension of a joint region 45, refer to FIG. 7) is set to be in the region of three times the inner diameter dimension d1 of the exhaust hole 34. Also, an angle of inclination 6 with respect to the left-right direction of the edge portions 41*a* and 41*b* of the flap main body 41 (refer to FIG. 7) is set to be in the region of 60°. Furthermore, the flap main body 41 is configured in such a way that, in a state coinciding with the peripheral edge of the exhaust hole 34 in such a way as to close off the exhaust hole 34, a distance D1 from an aperture edge 34*a* of the exhaust hole 34 to each edge portion 41*a* and 41*b* (an overlap amount, refer to FIG. 7) is at least 3 mm. In the case of the embodiment, the distance D1 from the aperture edge 34*a* of the exhaust hole 34 to each edge portion 41*a* and 41*b* (the overlap amount) is set to be in the region of 15 mm (in the region of three-eighths of the inner diameter dimension d1 of the exhaust hole 34). Also, in the embodiment, a distance D2 from the aperture edge 34*a* of the exhaust hole 34 to the joint region 45 (refer to FIG. 7) is set to be approximately the same as the distance D1 from an aperture edge 34*a* of the exhaust hole 34 to the edge portions 41*a* and 41*b*. Incidentally, the distance D1 from the aperture edge 34*a* of the exhaust hole 34 to each edge portion 41*a* and 41*b* (the overlap amount) is preferably set within a range of 10 mm to 20 mm in the flap main body 41. By setting within this range, an unnecessary enlargement of the flap main body 41 is restricted, and the exhaust hole 34 can be stably closed off by the flap main body 41.

That is, the flap main body 41 of the embodiment is configured in such a way as to cover the exhaust hole 34 in a region between straight lines L1 and L2 that respectively connect end portions 45*a* and 45*b*, which form two ends of the joint region 45 on the base portion 42 side, and a region on the leading end 43 side to which the coupling belt 47 is coupled (in the case of the embodiment, a boundary region 50 between the flap main body 41 and the coupling belt 47). Also, the edge portions 41*a* and 41*b* of the flap main body 41 are disposed in such a way as to approximately follow the straight lines L1 and L2 respectively (refer to FIG. 7).

In the case of the embodiment, the coupling belt 47 acting as a coupling member is a strip-form body configured to be integrated with the flap main body 41, and extends from the leading end 43 side of the flap main body 41. The coupling hole 48*a*, through which the engagement pin 16 of the holding and releasing device 15 acting as an opening/closing control device can be inserted and engaged with, is formed in the coupling end 48 forming an extended leading end 47*a* of the coupling belt 47 (refer to FIGS. 4 and 6). The coupling belt 47 is of a configuration such that the coupling end 48 is caused to protrude outside the bag main body 26 through the insertion hole 31 formed on the front edge side of the inflow aperture 29 in the bag main body 26. A width dimension W2 (refer to FIG. 7) of the coupling belt 47 is set to be smaller than the inner diameter dimension d1 of the exhaust hole 34 (the opening width dimension on the left-right direction side (a side in a direction approximately perpendicular to the longitudinal direction of the coupling belt 47) of the exhaust hole 34). Specifically, the width dimension W2 of the coupling belt 47 is set to be in the region of three-eighths the inner diameter dimension d1 of the exhaust hole 34. Also, a length dimension of the coupling belt 47 (strictly speaking, a distance between the boundary region 50 and the coupling hole 48*a*) is set in the following way. The length dimension of the coupling belt 47 is a dimension such that, when the bag main body 26 inflates in a state wherein a state of being coupled to the holding and releasing device 15 is maintained (a state wherein a closing off of the exhaust hole 34 by the flap main body 41 is maintained), the bag main body 26 can be inflated with no impediment, and a tension T (refer to FIG. 7) can be generated on the straight lines L1 and L2 that respectively connect the end portions 45*a* and 45*b* of the joint region 45 on the base portion 42 side and the boundary region 50 with the coupling belt 47 on the leading end 43 side in the flap main body 41.

Next, a manufacture of the airbag 25 of the embodiment will be described. The base portion 42 side of the flap main body 41 of the flap member 40 is sewn in advance, using thread, to the vehicle body side panel 55 in such a way as to form the joint region 45. Also, the attachment side region 59D of the tether base material 58D is caused to overlap with the vehicle body side panel 55, and attached by sewing, using thread, in a region that forms the peripheral edge of the inflow aperture 29. Subsequently, the inflow aperture 29, the attachment holes 30, and the insertion hole 31 are formed using a hole opening process. The attachment side region 59U of the tether base material 58U is sewn to the driver side panel 56. Next, the vehicle body side panel 55 and the driver side panel 56 are placed one on the other in a flattened state, while causing outer surface sides to come into contact, and by outer peripheral edges 55*a* and 56*a* being sewn together using thread, the bag-form bag main body 26 in a state wherein the flap member 40 is coupled thereto can be formed. The bag main body 26 is caused to invert, utilizing the inflow aperture 29, in order that a seam is not exposed to the exterior. Subsequently, the airbag 25 can be manufactured by the tether 38 being formed by leading ends of the tether configuring portions 60U and 60D being joined together.

The airbag 25 manufactured in this way can be mounted in a vehicle in the following way. Firstly, the retainer 7 is disposed in the interior of the airbag 25 in such a way as to cause unshown bolts to protrude from the attachment holes 30. Subsequently, the airbag 25 is folded in such a way that the airbag 25 can be housed in the case 11. Although a detailed depiction is omitted, the airbag 25 is folded in such a way as to reduce front-rear and left-right dimensions in order that the airbag 25 can be housed in the case 11 from a state flattened in such a way that the vehicle body side wall portion 28 and the driver side wall portion 36 coincide. At this time, the flap member 40 is also folded, together with the airbag 25, from a state disposed flattened in the interior of the bag main body 26 while causing the coupling end 48 on the leading end 47*a* side of the coupling belt 47 to protrude to the exterior from the insertion hole 31. Further, the folded airbag 25 is housed in the case 11. At this time, the coupling end 48 of the coupling belt 47 protruding to the exterior from the insertion hole 31 is caused to protrude from the through hole 12*a* of the bottom wall portion 12 of the case 11. The engagement pin 16 of the holding and releasing device 15 is inserted through the coupling hole 48*a* formed in the coupling end 48. Further, the coupling end 48 of the coupling belt 47 is caused to engage with the holding and releasing device 15 by causing a leading end side of the engagement pin 16 to be supported by the support stand 12*b*. The main body portion 9*a* of the inflator 9 is inserted into the case 11 from below. Further, the inflator 9 and the airbag 25 are attached to the case 11 utilizing unshown bolts caused to protrude from the bottom wall portion 12 and nuts. Furthermore, the case 11 is covered with the airbag cover 20, and the airbag cover 20 is attached to the case 11 utilizing the rivet 21 or the like. Subsequently, the airbag device M can be assembled by installing unshown horn switch mechanisms in the attachment pieces 13a of the case 11. The airbag device M can be mounted in a vehicle by being attached in advance to the steering wheel main body 1 fastened to the steering shaft SS utilizing unshown attachment substrates of the horn switch mechanisms.

The airbag device M of the embodiment is such that when inflating gas is discharged from the gas exhaust port 9b of the inflator 9, the airbag 25 inflates owing to the inflating gas being caused to flow into the interior. The airbag 25 pushes and opens the door portions 20b and 20b of the airbag cover 20, protrudes from the case 11, and causes inflation to be completed in such a way as to cover approximately the whole of the upper face of the steering wheel W, as shown by two-dot chain lines of FIGS. 1 and 2, and in FIG. 8.

Figure 11A:
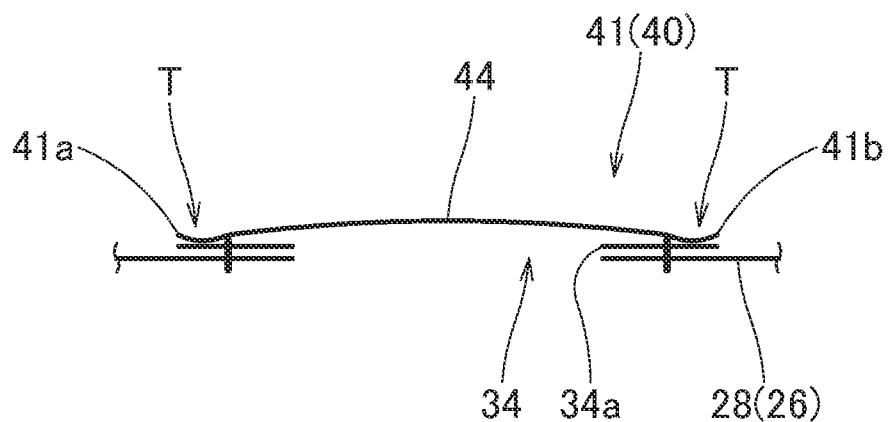
FIGS. 11A and 11B are partially enlarged schematic sectional views showing a state of the exhaust hole and the flap member when the airbag inflates in a state wherein a coupled state of the flap member and the engagement member is maintained in the airbag device of the embodiment.
Figure 11B:
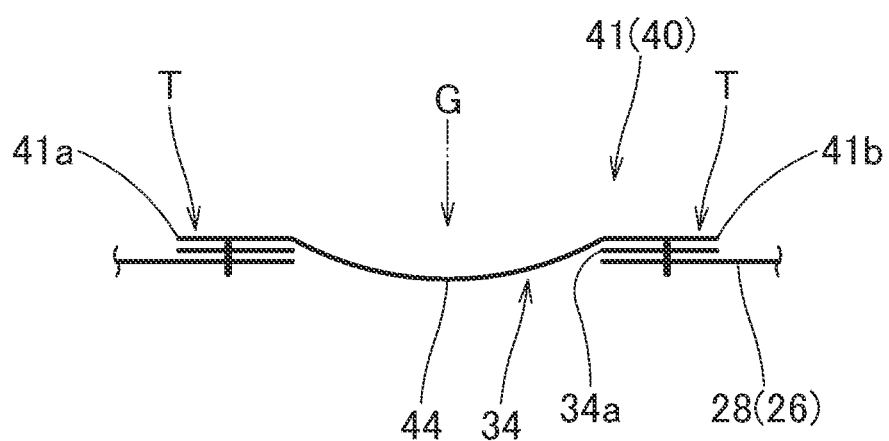

Further, the airbag device M of the embodiment is such that the flap main body 41 closes off the exhaust hole 34 from the inner peripheral face side of the airbag 25. Further, the external form of the flap main body 41 is configured in such a way as to cover the exhaust hole 34 in a region between the straight lines L1 and L2 that respectively connect the two end portions 45a and 45b of the joint region 45 on the base portion 42 side joined to the peripheral edge of the exhaust hole 34 and a region on the leading end 43 side to which the coupling belt 47 acting as a coupling member is coupled (in the case of the embodiment, the boundary region 50 between the flap main body 41 and the coupling belt 47) (refer to FIG. 7). The airbag device M of the embodiment is such that when the airbag 25 is caused to inflate in a state wherein a coupling of the coupling belt 47 to the holding and releasing device 15 acting as an opening/closing control device is maintained, the tension T is generated in such a way as to approximately follow the straight lines L1 and L2 in the flap main body 41. Further, the inner peripheral face side of the exhaust hole 34 is covered in a region of the flap main body 41 between the regions in which the tension is generated. This means that when the airbag 25 is caused to inflate in a state wherein a coupling to the holding and releasing device 15 is maintained, the tension T acts in such a way as to approximately follow the straight lines L1 and L2, and the flap main body 41 is such that a region farther outward than the aperture edge 34a of the exhaust hole 34 is held down by the tension T. Also, the region of the flap main body 41 between the regions in which the tension is generated, that is, the region covering the exhaust hole 34 (an intermediate region 44), conversely takes on an aspect wherein slackness occurs due to the generation of the tension T that approximately follows the straight lines L1 and L2 (refer to FIG. 11A). However, as the flap main body 41 covers the exhaust hole 34 from the inner peripheral face side of the airbag 25, the flap main body 41 is subjected to internal pressure of the inflating gas G that has flowed into the airbag 25, and the intermediate region 44 in the slack state takes on an aspect of being pressed against the peripheral edge of the exhaust hole 34, as shown in FIG. 11B. Because of this, the airbag device M of the embodiment is such that a rising up of the flap main body 41 from the airbag 25 can be unerringly restricted, and leaking of the inflating gas G from the exhaust hole 34 can be restricted.

Consequently, the airbag device M of the embodiment is such that leaking of the inflating gas G from the exhaust hole 34 can be restricted when a closing off of the exhaust hole 34 is maintained.

Specifically, the airbag device M of the embodiment is such that an opening/closing control device that controls an opening and closing of the exhaust hole 34 is configured of the holding and releasing device 15, which can hold or release a coupled state of the coupling end 48 of the coupling belt 47 acting as a coupling member of the flap member 40.

Figure 12A:
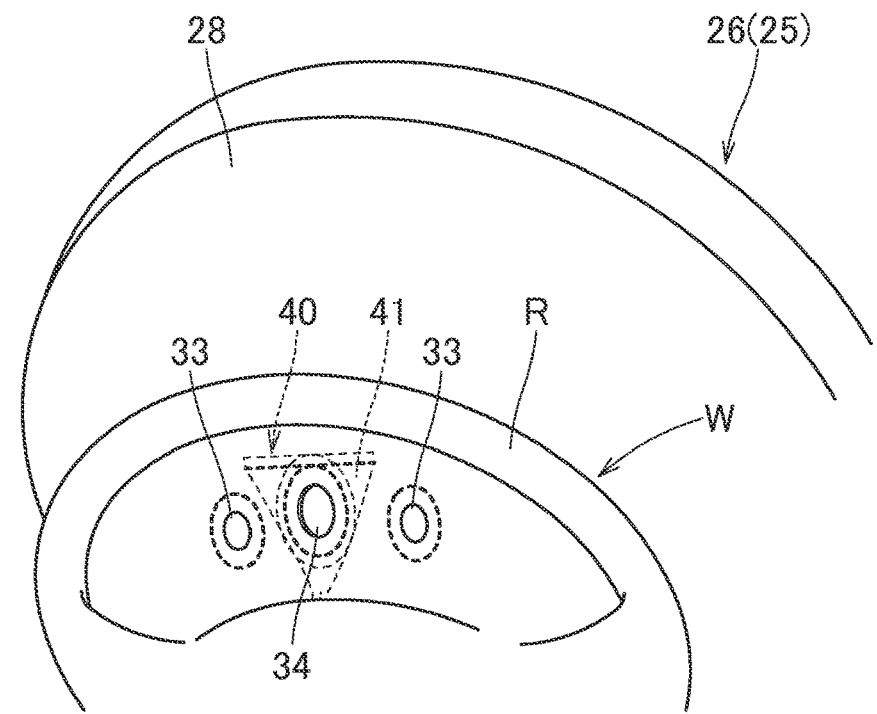
Figure 12B:
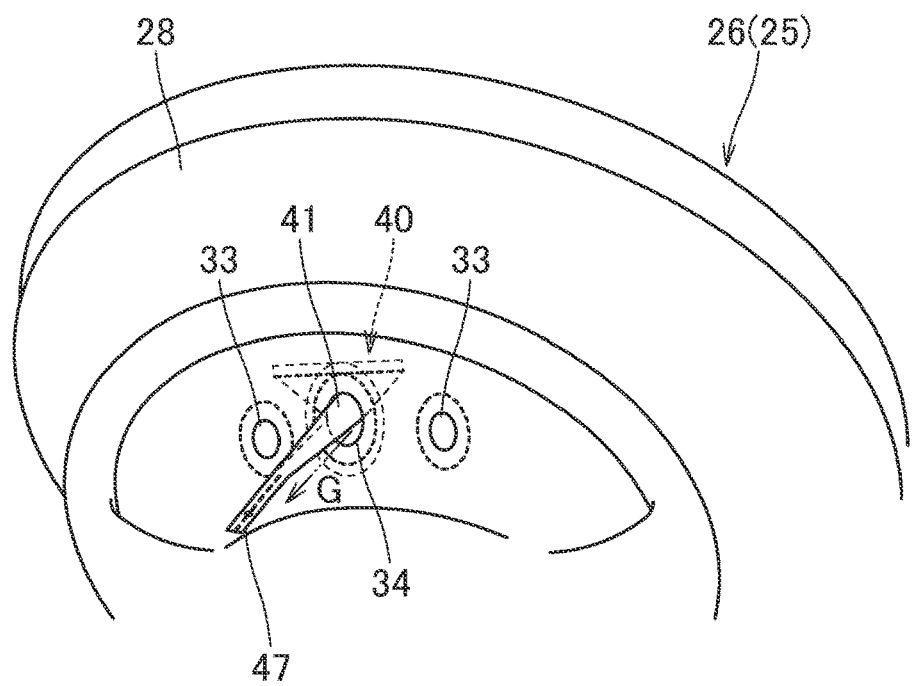

Further, the airbag device M of the embodiment is such that when, for example, the control device 70, which causes a signal from the predetermined sensor 75, 76, or 77 to be input, detects a seating of a small driver MD1, or detects that the driver MD is seated in a position in proximity to the steering wheel W, the control device 70 causes an operation signal to be output to the actuator 17 of the holding and releasing device 15 approximately simultaneously with an operation of the inflator 9, the engagement pin 16 is operated in such a way as to be drawn in, and the held state of the coupling end 48 of the coupling belt 47 is released. Further, the airbag 25 inflates in an opened mode such that the exhaust hole 34 is caused to open, as shown in FIGS. 10 and 12B, and inflation is caused to be completed by excess inflating gas G being discharged from the exhaust hole 34. Because of this, inflation of the airbag 25 is completed in a state wherein a rise in internal pressure is restricted by excess inflating gas G being discharged from the exhaust hole 34, because of which the small driver MD1 and the driver MD seated in proximity to the steering wheel W being pressed more than necessary is restricted by the airbag 25 wherein internal pressure is set to be low, and the small driver MD1 and the driver MD seated in proximity to the steering wheel W can be protected gently.

Conversely, when, for example, the control device 70 detects a seating of a large driver MD2, or detects that the driver MD is seated in a position comparatively distanced from the steering wheel W, no operation signal is output to the actuator 17 from the control device 70. Further, the airbag 25 inflates in a closed off mode such that a state wherein the coupling end 48 of the coupling belt 47 is held by the holding and releasing device 15 is maintained, and a state wherein the exhaust hole 34 is closed off by the flap main body 41 is maintained. That is, inflation of the airbag 25 is caused to be completed with the closed off state of the exhaust hole 34 still maintained, as shown in FIGS. 8, 9, and 12A. Because of this, inflation of the airbag 25 is caused to be completed in a state of high internal pressure wherein inflating gas is not discharged from the exhaust hole 34, meaning that the large driver MD2 and the driver MD seated comparatively distanced from the steering wheel W can be unerringly protected, without bottoming out, by the inflated airbag 25, while securing sufficient internal pressure, and with good cushioning.

Also, in the airbag device M of the embodiment, the flap main body 41 is such that the two edge portions 41a and 41b opposing on the width direction sides (the left-right direction sides) are caused to incline in such a way as to approximately follow the straight lines L1 and L2. That is, the embodiment is such that when the airbag 25 is caused to inflate in a state wherein coupling to the holding and releasing device 15 is maintained, the tension T is generated in such a way as to approximately follow the edge portions 41a and 41b opposing on the width direction sides of the flap main body 41. In still other words, the airbag device M of the embodiment is such that the flap main body 41 is of a configuration that does not include a region that extends outward from a region in which tension is generated. Because of this, a rising up of a region extending outward from a region in which tension is generated can be restricted, and a gap is still less likely to occur between the flap main body 41 and the peripheral edge of the exhaust hole 34. Also, an area (size) of the flap main body 41 can be reduced as far as possible, and material forming the flap main body 41 can also be reduced. Of course, when this kind of point is not taken into consideration, a flap main body having an approximately rectangular form, for example, wherein edge portions opposing on width direction sides are not caused to incline, may be used as a flap main body. In the embodiment, the flap main body 41 is joined to the vehicle body side wall portion 28 side by the joint region 45 formed in a position approximately coinciding with ends of the edge portions 41*a* and 41*b* on the base portion 42 side. However, a joint region 45' may be formed in a position deviating slightly more to the base portion 42 side than the ends of the edge portions 41*a* and 41*b*, as shown by a two-dot chain line in FIG. 7.

Furthermore, the airbag device M of the embodiment is such that the width dimension W2 of the coupling belt 47 acting as a coupling member is set to be smaller than an aperture width dimension of the exhaust hole 34 (in the case of the embodiment, the inner diameter dimension d1 of the exhaust hole 34) on a side in a direction (the left-right direction side) approximately perpendicular to the longitudinal direction of the coupling belt 47. This means that when the airbag 25 is caused to inflate in a state wherein coupling to the holding and releasing device 15 is held, the tension T generated in the flap main body 41 is still more stable, and can be caused to act in a vicinity of the edge portions 41*a* and 41*b* of the flap main body 41. Of course, when this kind of point is not taken into consideration, a coupling member set to be wider than an aperture width dimension of an exhaust hole may be used as a coupling member. The airbag device M of the embodiment is such that the coupling belt 47 is configured to be integrated with the flap main body 41, but a configuration wherein a coupling belt is configured of a strip-form body separate from a flap main body, and sewn to the flap main body, may be adopted. Also, a coupling member form is not limited to the strip form of the embodiment. For example, a coupling member formed of a string-form body having a loop portion through which an engagement pin of a holding and releasing device can be inserted on a leading end side may be used as a coupling member.

Also, the airbag device M of the embodiment is such that the exhaust hole 34 is configured with an aperture form being approximately circular, and the flap main body 41 is configured in such a way that the distance D1 from the aperture edge 34*a* of the exhaust hole 34 to the edge portions 41*a* and 41*b* is at least 3 mm. Because of this, a state wherein the exhaust hole 34 is closed off by the flap main body 41 can be stabilized.

Still further, the airbag device M of the embodiment is such that the exhaust hole 34 is configured to be formed in a region in the airbag 25 whose curvature is set to be low, and which is approximately planar, in a cross-section when inflation is completed. Specifically, the airbag device M of the embodiment is for use in a steering wheel, and the exhaust hole 34 is formed in a region of the vehicle body side wall portion 28 of the bag main body 26 disposed in a position farther to the inner side than the ring portion R of the steering wheel W when inflation is completed. A region of the vehicle body side wall portion 28 disposed in a position farther to the inner side than the ring portion R is disposed in an approximately planar form in the bag main body 26 when inflation is completed (refer to FIGS. 9 and 10). That is, the airbag device M of the embodiment is such that the exhaust hole 34, and the flap main body 41 that closes off the exhaust hole 34 from the inner side, are disposed in a region disposed in an approximately planar form in the vehicle body side wall portion 28 of the airbag 25 (the bag main body 26) when inflation is completed. This means that when the airbag 25 is caused to inflate in a state wherein a coupling of the coupling belt 47 to the holding and releasing device 15 is maintained (held), a gap occurring between a region in which tension is generated (a region on the edge portions 41*a* and 41*b* side) and the vehicle body side wall portion 28 when the tension T is caused to act in a vicinity of the edge portions 41*a* and 41*b* of the flap main body 41 can be restricted. When this kind of point is not taken into consideration, a configuration wherein an exhaust hole is disposed in a region whose curvature is set to be high in a cross-section when inflation is completed, which in the case of the embodiment is a region on an outer peripheral edge side positioned farther to the outer peripheral side than the ring portion R, may be adopted. When an exhaust hole is disposed in this kind of position, a gap is certainly liable to occur between a region on an edge portion side of a flap main body wherein tension is generated owing to an airbag inflating (disposed in an approximately linear form in cross-section) and a region on a peripheral edge of the exhaust hole, in such a way as to cause the region on the peripheral edge of the exhaust hole to curve considerably in a sectional form. However, as the flap main body is of a configuration that covers the exhaust hole from an inner peripheral face side of the airbag, the flap main body takes on an aspect pressed against the peripheral edge of the exhaust hole by internal pressure of inflating gas flowing into the airbag, and a leaking of gas from the exhaust hole can be stably restricted.

The airbag device M of the embodiment is of a configuration wherein the two always opened vent holes 33 and 33 are disposed separately from the exhaust hole 34 in the airbag 25. However, the existence of an always opened vent hole is not particularly limited. Whether or not a vent hole is disposed, a size, a number disposed, and the like, can be changed as appropriate in accordance with an occupant protection mode. Also, although a description has been given in the embodiment employing the steering wheel airbag device M as an example, an airbag device to which the present disclosure is applicable is, of course, not limited to a steering wheel airbag device. For example, the present disclosure may be applied to a passenger seat airbag device.

The invention relates to an airbag device of the following configuration.

The airbag device includes:

an airbag, folded and housed in a housing region, configured to inflate in such a way as to protrude from the housing region owing to an inflating gas being caused to flow into an interior, and having an exhaust hole from which some of the inflating gas caused to flow into the interior can be discharged when opened;

an opening/closing control device that is disposed on the housing region side and can control an opening and closing of the exhaust hole; and a flap member that can close off the exhaust hole, the flap member including a flap main body that is configured of a sheet having flexibility, and is set to be of a size such that the exhaust hole can be closed off, wherein a base portion side is joined to a peripheral edge of the exhaust hole in a position farther to an outer peripheral edge side of the airbag than the exhaust hole, and a coupling member that extends from a leading end side opposing the base portion of the flap main body, and is of a configuration such that a coupling end side of the extended leading end is caused to be coupled with the opening/closing control device on the housing region side, the flap main body is configured in such a way that when the airbag inflates in a state wherein a coupling of the coupling member to the opening/closing control device is maintained, a closed off state of the exhaust hole is maintained, and when the airbag inflates in a state wherein a coupling of the coupling member to the opening/closing control device is released, the exhaust hole is caused to open; and wherein the flap main body has an approximately symmetrical external form with a central line in a width direction following a longitudinal direction of the coupling member as a reference, and is configured in such a way that the coupling member is caused to extend from an approximate width direction center on the leading end side, the flap main body is disposed in such a way as to be able to close off the exhaust hole from an inner peripheral face side of the airbag, a width dimension on the base portion side is set to be greater than an aperture width dimension of the exhaust hole on a side in a direction approximately perpendicular to the longitudinal direction of the coupling member, an approximate whole of the base portion side is joined to the peripheral edge of the exhaust hole in the airbag, and the flap main body is configured in such a way as to cover the exhaust hole in a region between straight lines that connect one end each of a joint region on the base portion side and a region on the leading end side to which the coupling member is caused to be coupled.

The airbag device of the invention is such that a flap main body closes off an exhaust hole from an inner peripheral face side of an airbag. Further, an external form of the flap main body is of a configuration that covers the exhaust hole in a region between straight lines that connect one end each of a joint region on a base portion side joined to a peripheral edge of the exhaust hole and a region on a leading end side to which a coupling member is caused to be coupled. The airbag device of the invention is such that when the airbag is caused to inflate in a state wherein a coupling of the coupling member to an opening/closing control device is maintained, tension is generated in the flap main body in such a way as to approximately follow the straight lines. Further, an inner peripheral face side of the exhaust hole is covered in a region of the flap main body between the regions in which the tension is generated. This means that when the airbag is caused to inflate in a state wherein a coupling to the opening/closing control device is maintained, tension acts in such a way as to approximately follow the straight lines, and a region of the flap main body farther outward than the edge portion of the exhaust hole is held down by the tension. Also, the region of the flap main body between the regions in which the tension is generated, that is, the region covering the exhaust hole (an intermediate region), conversely takes on an aspect wherein slackness occurs due to the generation of the tension that approximately follows the straight lines. However, as the flap main body covers the exhaust hole from the inner peripheral face side of the airbag, the flap main body is subjected to internal pressure of an inflating gas that has flowed into the airbag, and the intermediate region in the slack state takes on an aspect of being pressed against the peripheral edge of the exhaust hole. Because of this, the airbag device of the embodiment is such that a rising up of the flap main body from the airbag can be unerringly restricted, and leaking of the inflating gas from the exhaust hole can be restricted.

Consequently, the airbag device of the invention is such that leaking of inflating gas from the exhaust hole can be restricted when a closing off of the exhaust hole is maintained.

Also, in the airbag device of the invention, the flap main body is such that edge portions opposing on two width direction sides are caused to incline in such a way as to approximately follow the straight lines that connect one end each of the joint region on the base portion side and the region on the leading end side to which the coupling member is caused to be coupled. This means that when the airbag is caused to inflate in a state wherein coupling to the opening/closing control device is maintained, the tension is generated in such a way as to approximately follow the edge portions opposing on the width direction sides of the flap main body. In other words, the airbag device of the aforementioned configuration is such that the flap main body is of a configuration that does not include a region that extends outward from a region in which tension is generated. Because of this, a rising up of a region extending outward from a region in which tension is generated can be restricted, and a gap is still less likely to occur between the flap main body and the peripheral edge of the exhaust hole, which is preferable. Also, an area (size) of the flap main body can be reduced as far as possible, and material forming the flap main body can also be reduced.

Furthermore, the airbag device of the aforementioned configuration is preferably of a configuration such that a width dimension of the coupling member is set to be smaller than an aperture width dimension of the exhaust hole on a side in a direction approximately perpendicular to a longitudinal direction of the coupling member. The airbag device having this kind of configuration is such that when the airbag is caused to inflate in a state wherein coupling to the opening/closing control device is maintained, the tension generated in the flap main body is still more stable, and can be caused to act in a vicinity of the edge portions of the flap main body.

Specifically, the airbag device of the aforementioned configuration is preferably configured in such a way that the exhaust hole is configured with an aperture form being approximately circular, and a distance from an aperture edge of the exhaust hole to the edge portions in the flap main body is at least 3 mm. By adopting this kind of configuration, a state wherein the exhaust hole is closed off by the flap main body can be stabilized.

Further still, the airbag device of the aforementioned configuration is preferably such that the exhaust hole is configured to be formed in a region in the airbag whose curvature is set to be low, and which is approximately planar, in a cross-section when inflation is completed. By adopting this kind of configuration for the airbag device, the exhaust hole, and the flap main body that closes off the exhaust hole from the inner side, are disposed in a region disposed in an approximately planar form in the airbag when inflation is completed. This means that when the airbag is caused to inflate in a state wherein a coupling of the coupling member to the opening/closing control device is maintained, a gap occurring between a region in which tension is generated and the airbag when the tension is caused to act in the flap main body can be restricted.

What is claimed is:
1. An airbag device, comprising:
an airbag, folded and housed in a housing region, configured to inflate in such a way as to protrude from the housing region owing to an inflating gas being caused to flow into an interior, and having an exhaust hole from which some of the inflating gas caused to flow into the interior can be discharged when opened;

an opening/closing control device that is disposed on a housing region side and can control an opening and closing of the exhaust hole; and a flap member that can close off the exhaust hole, the flap member including a flap main body that is configured of a sheet having flexibility, and is set to be of a size such that the exhaust hole can be closed off, wherein a base portion side is joined to a peripheral edge of the exhaust hole in a position farther to an outer peripheral edge side of the airbag than the exhaust hole, and a coupling member that extends from a leading end side opposing the base portion side of the flap main body, and is of a configuration such that a coupling end side of the coupling member is caused to be coupled with the opening/closing control device on the housing region side, the flap main body is configured in such a way that when the airbag inflates in a state wherein a coupling of the coupling member to the opening/closing control device is maintained, a closed off state of the exhaust hole is maintained, and when the airbag inflates in a state wherein a coupling of the coupling member to the opening/closing control device is released, the exhaust hole is caused to open; and wherein the flap main body has an approximately symmetrical external form with a central line in a width direction following a longitudinal direction of the coupling member as a reference, and is configured in such a way that the coupling member is caused to extend from an approximate width direction center on the leading end side, the flap main body is disposed in such a way as to be able to close off the exhaust hole from an inner peripheral face side of the airbag, a width dimension on the base portion side is set to be greater than an aperture width dimension of the exhaust hole on a side in a direction approximately perpendicular to the longitudinal direction of the coupling member, an approximate whole of the base portion side is joined to the peripheral edge of the exhaust hole in the airbag, and the flap main body is configured in such a way as to cover the exhaust hole in a region between straight lines that connect one end each of a joint region on the base portion side and a region on the leading end side to which the coupling member is caused to be coupled.

2. The airbag device according to claim 1, wherein the flap main body is such that edge portions opposing on two width direction sides are caused to incline in such a way as to approximately follow the straight lines that connect one end each of the joint region on the base portion side and the region on the leading end side to which the coupling member is caused to be coupled.

3. The airbag device according to claim 2, wherein a width dimension of the coupling member is set to be smaller than an aperture width dimension of the exhaust hole on a side in a direction approximately perpendicular to a longitudinal direction of the coupling member.

4. The airbag device according to claim 2, wherein the exhaust hole is configured with an aperture form being approximately circular, and a distance from an aperture edge of the exhaust hole to the edge portions in the flap main body is at least 3 mm.

5. The airbag device according to claim 1, wherein the opening/closing control device is configured of a holding and releasing device that can hold or release a coupled state of the coupling member.

6. The airbag device according to claim 1, wherein the exhaust hole is formed in a region in the airbag whose curvature is set to be low, and which is approximately planar, in a cross-section when inflation is completed.

7. The airbag device according to claim 6, wherein the airbag device is of a configuration mounted on a steering wheel having a ring portion that is gripped when steering, the airbag includes a vehicle body side wall portion disposed on the steering wheel side when inflation is completed and a driver side wall portion disposed on the driver side, and the exhaust hole is formed in a region disposed farther to an inner side than the ring portion in the vehicle body side wall portion of the airbag when inflation is completed.

* * * * *